(12) United States Patent
Baiye

(10) Patent No.: US 7,945,499 B2
(45) Date of Patent: May 17, 2011

(54) METHOD AND SYSTEM FOR PROVIDING A FIXED RATE ANNUITY WITH A LOCK-IN INTEREST RATE FEATURE

(75) Inventor: Simpa Baiye, Waxhaw, NC (US)

(73) Assignee: Hartford Fire Insurance Company, Hartford, CT (US)

( * ) Notice: Subject to any disclaimer, the term of this patent is extended or adjusted under 35 U.S.C. 154(b) by 244 days.

(21) Appl. No.: 12/290,537

(22) Filed: Oct. 31, 2008

(65) Prior Publication Data

US 2009/0063203 A1 Mar. 5, 2009

Related U.S. Application Data

(63) Continuation-in-part of application No. 11/787,493, filed on Apr. 16, 2007, now Pat. No. 7,660,757.

(51) Int. Cl.
*G06Q 40/00* (2006.01)

(52) U.S. Cl. ............................... 705/35; 705/36 R

(58) Field of Classification Search .............. 705/35, 705/36 R, 36 T, 38, 39, 40, 4
See application file for complete search history.

(56) References Cited

U.S. PATENT DOCUMENTS

| | | | |
|---|---|---|---|
| 5,754,980 A | 5/1998 | Anderson et al. | |
| 5,878,405 A | 3/1999 | Grant et al. | |
| 5,893,071 A | 4/1999 | Cooperstein | |
| 5,913,198 A | 6/1999 | Banks | |
| 5,926,800 A | 7/1999 | Baronowski et al. | |
| 5,933,815 A | 8/1999 | Golden | |
| 6,275,807 B1 * | 8/2001 | Schirripa | 705/36 R |
| 6,611,808 B1 | 8/2003 | Preti et al. | |
| 6,611,815 B1 | 8/2003 | Lewis et al. | |
| 6,636,834 B1 * | 10/2003 | Schirripa | 705/36 R |
| 6,950,805 B2 | 9/2005 | Kavanaugh | |
| 6,963,852 B2 | 11/2005 | Koresko | |
| 7,016,871 B1 | 3/2006 | Fisher et al. | |
| 7,080,032 B2 * | 7/2006 | Abbs et al. | 705/35 |
| 7,089,201 B1 | 8/2006 | Dellinger et al. | |
| 7,113,913 B1 | 9/2006 | Davis et al. | |
| 7,124,088 B2 | 10/2006 | Bauer et al. | |
| 7,376,608 B1 * | 5/2008 | Dellinger et al. | 705/36 R |
| 7,398,241 B2 * | 7/2008 | Fay et al. | 705/36 R |
| 7,613,644 B1 | 11/2009 | Abbs et al. | |
| 7,624,058 B1 | 11/2009 | Abbs et al. | |
| 2001/0014873 A1 | 8/2001 | Henderson et al. | |
| 2001/0047325 A1 | 11/2001 | Livingston | |
| 2002/0035527 A1 | 3/2002 | Corrin | |
| 2002/0174045 A1 | 11/2002 | Arena et al. | |

(Continued)

OTHER PUBLICATIONS

Shapiro et al. "Separating Annuity Buyers by Fixed vs. Variable" Apr. 5, 1993, National Underwriter (Life.Health.Financial Serviecs), V97N14 PP20-21.*

(Continued)

*Primary Examiner* — Kelly Campen
(74) *Attorney, Agent, or Firm* — Howard IP Law Group, PC

(57) ABSTRACT

A data processing method and system administers a deferred annuity contract during the accumulation phase of a contract term. The system stores an account value and a guaranteed rate of interest on the account value. The system may credit an interest rate which is reset periodically (reset rate). The system is configured for changing from the reset rate to the guaranteed rate, when the reset rate falls below the guaranteed rate.

29 Claims, 6 Drawing Sheets

U.S. PATENT DOCUMENTS

| | | | |
|---|---|---|---|
| 2002/0188540 A1* | 12/2002 | Fay et al. | 705/36 |
| 2003/0088430 A1 | 5/2003 | Ruark | |
| 2003/0105652 A1 | 6/2003 | Arena et al. | |
| 2003/0120570 A1 | 6/2003 | Dellinger et al. | |
| 2003/0163402 A1 | 8/2003 | Kincart | |
| 2004/0039601 A1 | 2/2004 | Anderson | |
| 2004/0039608 A1 | 2/2004 | Mazur et al. | |
| 2004/0088236 A1 | 5/2004 | Manning | |
| 2004/0172350 A1 | 9/2004 | Atkinson et al. | |
| 2004/0181436 A1 | 9/2004 | Lange | |
| 2004/0204951 A1 | 10/2004 | Wood et al. | |
| 2004/0267647 A1 | 12/2004 | Brisbois | |
| 2005/0010453 A1 | 1/2005 | Terlizzi et al. | |
| 2005/0060251 A1 | 3/2005 | Schwartz et al. | |
| 2005/0080698 A1 | 4/2005 | Perg et al. | |
| 2005/0144103 A1 | 6/2005 | Perg et al. | |
| 2005/0240521 A1* | 10/2005 | Fuentes-Torres | 705/39 |
| 2006/0074787 A1 | 4/2006 | Perg et al. | |
| 2006/0080148 A1 | 4/2006 | Koresko | |
| 2006/0089892 A1 | 4/2006 | Sullivan et al. | |
| 2006/0095353 A1 | 5/2006 | Midlam | |
| 2006/0111997 A1* | 5/2006 | Abbott et al. | 705/35 |
| 2006/0111998 A1 | 5/2006 | Fisher et al. | |
| 2006/0143055 A1 | 6/2006 | Loy et al. | |
| 2006/0149651 A1 | 7/2006 | Robinson | |
| 2006/0155622 A1 | 7/2006 | Laux | |
| 2006/0190373 A1 | 8/2006 | Perg et al. | |
| 2006/0195375 A1 | 8/2006 | Bohn | |
| 2006/0206398 A1 | 9/2006 | Coughlin | |
| 2006/0206401 A1 | 9/2006 | Abbs et al. | |
| 2006/0212379 A1 | 9/2006 | Perg et al. | |
| 2006/0212380 A1 | 9/2006 | Williams et al. | |
| 2007/0011063 A1 | 1/2007 | Shelon et al. | |
| 2007/0011069 A1 | 1/2007 | Bevacqua, Jr. | |
| 2007/0011086 A1 | 1/2007 | Dellinger et al. | |
| 2007/0021986 A1 | 1/2007 | Cheung et al. | |
| 2007/0038488 A1 | 2/2007 | Bauer et al. | |
| 2007/0078690 A1 | 4/2007 | Kohl | |
| 2007/0100715 A1 | 5/2007 | O'Donnell et al. | |
| 2007/0100720 A1 | 5/2007 | Bonvouloir | |
| 2007/0100726 A1 | 5/2007 | O'Flinn et al. | |
| 2007/0100727 A1 | 5/2007 | Multer et al. | |
| 2007/0106589 A1 | 5/2007 | Schirripa | |
| 2007/0162380 A1 | 7/2007 | Conroy | |
| 2007/0198352 A1 | 8/2007 | Kannegiesser | |
| 2007/0198377 A1 | 8/2007 | Livingston et al. | |
| 2007/0239572 A1 | 10/2007 | Harris et al. | |
| 2007/0244777 A1 | 10/2007 | Torre et al. | |
| 2007/0271201 A1 | 11/2007 | Armand et al. | |
| 2007/0278288 A1 | 12/2007 | Simmons | |

OTHER PUBLICATIONS

Anonymous "Q2 2005 American Eqty Invt Life Hld Co Earnings Conference Call—Final" Aug. 4, 2005, Fair Disclosure Wire.*
Key to Making Retirement Savings last: The Withdrawl Rate, New York Life, www.newyorklife.com/cda/0,3254, 14198,00.html. (accessed May 22, 2008).
"The Power and Protection of Income Annuities" (Empire Fidelity Investments Life Insurance Company), http://personal.fidelity.com/products/annuities/pdf/IncomeAnnuitySpecialReport.pdf.
Form 485BPOS (Apr. 26, 2006), Transamerica-NewLTC-LifetimeGMWB_May2006SECFiling.pdf.
Prospectus, Penn Mutual Variable Annuity Account III, Enhanced Credit Variable Annuity; May 1, 2007.
"Glossary of Insurance Terms", Insurance Information Institute, http:www.iii.org/media/glossary (Jan. 1, 2008).
Penn Mutual Variable Annuity Account III, SEC Form 497, Filed Oct. 2, 2006.
New York Life Longevity Benefit Variable Annuity Brochure, New York Life Insurance Company, May 2007.
New York Life Longevity Benefit Variable Annuity FactSheet, New York Life Insurance Company, May 2007.
Paradis, T., More Funds Adopt Performance-Based Fees, Washingtonpost.com (Associated Press), Apr. 8, 2007.
"Facts about the New York Life Longevity Benefit Variable Annuity Product", New York Life Insurance Company, May 2007.
New York Life Longevity Benefit Variable Annuity Prospectus Amendment dated Aug. 15, 2007, New York Life Insurance Company, Aug. 2007.
S&P U.S. Indices Index Methodology, Standard & Poor's, Sep. 2007.
Blodget, H., Money for Nothing: The Real Trouble with Mutual Funds, Slate.com, Dec. 1, 2004.
"Income Select for Life"; Transamerica Financial Life Insurance Company; https://www.transamericaadvisor.com/contentServer/MediaServer? uri=/site/tciidex/media/PDF/Annuities_TCI/Client_Approved_Material/Tips_and_Techniques/BRIS.pdf.
"Jackson Enhances Living Benefit Options within its Perspective Family of Variable Annuities"; Business Wire; Apr. 30, 2007.
"Learn the Basics about Lifetime Legacy"; http://www.americo.com/lifetime/lifetimelegacy.html; Accessed Jan. 4, 2008.
"Accelerated Death Benefits"; http://www.medicare.gov/; Accessed Jan. 4, 2008.
"Alternatives to Long Term Care Insurance (LTCi)"; Senior Wealth Protection Advocates; http://www.senior-wealth-protection-advocates.com/long-term-care-insurancealternatives.html; Site Accessed Jan. 4, 2008.
"Just the Facts: The Best of America All American Gold Annuity Key Facts"; Nationwide Financial Services, Inc.; https://ssc.nwseivicecenter.com/media/pdf/product/VAM-0504AO-FLpdf.
Form N-4, Transamerica Life Insurance Company; Flexible Premium Variable Annuity-J; Separate Account VA Y; filed Feb. 22, 2006.
"Fidelity.com Glossary" (letter "p"); https://scs.fidelity.com/webxpress/help/topics/help_definition_p.shtml; Accessed Jan. 4, 2008.
Stout, R.G. et al.; "Dynamic Retirement Withdrawal Planning"; Financial Services Review 15 (2006) 117-131.
"Prudential Investments Introduces Strategic Partners Annuity One; New Variable Annuity Offers Investors World-Class Money Managers and Flexible Product Features"; Business Wire, Oct. 9, 2000.
"Retireonyourterms"; http://www.retireonyourterms.com/ glossary/GlossaryText.htm; Accessed Jan. 4, 2008.
Buckingham, B.; "Making IRAs Last a Lifetime with Annuities"; Life & Health Advisor; Mar. 2006.
"RiverSource Innovations Select Variable Annuity"; http://www.riversource.com/rvsc/global/docs/INNOV-SELECT-NY-AAG.pdf.
"Pacific Life Individual (k) Program"; https://annuities.myaccount.pacificlife.com/public/corporate/product_info/pos/guide pos_1911-07b.pdf.

* cited by examiner

METHOD AND SYSTEM FOR PROVIDING A FIXED RATE ANNUITY WITH A LOCK-IN INTEREST RATE FEATURE

CROSS-REFERENCE TO RELATED APPLICATIONS

This application is a continuation-in-part of U.S. patent application Ser. No. 11/787,493, filed Apr. 16, 2007 now U.S. Pat. No. 7,660,757.

BACKGROUND OF THE INVENTION

1. Field of the Invention

The present invention relates to a method and system for providing a fixed rate annuity, offering both a static, guaranteed rate for a multi-year period, as well as a rate which fluctuates periodically (reset rate); and more particularly, to a data processing method for administering an annuity contract for an annuitant, wherein the annuitant initially selects the reset rate while retaining a one-time option, exercised manually or automatically, to switch to, or lock-in, the guaranteed interest rate for the remainder of the contract term, when the reset rate falls below the guaranteed rate.

2. Description of the Prior Art

A deferred annuity is typically used to provide accumulation and, potentially, a future stream of annuity income. The deferred annuity comprises an accumulation period during which the account value will vary with the underlying investments. Deferred annuities typically provide guaranteed income for life, which transfers some portion or all of the risk of outliving one's accumulated assets to the insurer.

One basis for distinguishing commonly available deferred annuities is whether the annuity is classified as a "fixed annuity" or a "variable annuity." In a fixed annuity, the insurer guarantees a fixed rate of interest applicable to each annuity deposit. Therefore, a fixed annuity is desirable for those seeking a "safe" investment. The guaranteed interest rate may apply for a specified period of time, often one year or more. Often, a rate guaranteed for more than one year is called a "multi-year guarantee" (MYG rate). The rate credited on a fixed annuity is reset periodically, moving in an amount and a direction that correlates with the yields available on fixed-income investments available to the insurer. The rate may also be adjusted based upon an external index. For a given term, fixed annuities typically only offer annuitants the afore-mentioned guaranteed rate of interest for multi-years (MYG rate) or alternatively, an initial rate that can be reset periodically (typically annually). The MYG rate is often lower than the reset rate because the insurer has less flexibility. An annuitant must select only one of these options during a contract term.

Thus, typically, an annuitant seeking a high rate of return, who selects a fixed annuity, elects to receive rates that can be reset periodically, and faces the risk that the issuing company may significantly lower rates at the end of each period within the life of the contract. This exposure to risk reduces the attractiveness of the annuity as an investment. Potential annuitants who require a certain level of income in retirement, and will be depending upon the annuity to supply that income, may seek other investments, outside of the annuity market, without that potential exposure.

Thus, there remains a need in the art for a data processing method, for administering an annuity contract for a contract term, wherein the annuity contract has a lock-in feature that provides a guarantee that the interest payable will not fall below a guaranteed interest rate, should adjustable rates be significantly reset downwards.

In addition, there is needed an annuity contract wherein a guaranteed interest rate is automatically applied to the account balance of the annuity, when an adjustable interest rate payable falls below the guaranteed interest rate, so that the annuitant need not concern himself or herself with the fluctuations in the adjustable rate.

SUMMARY OF THE INVENTION

The present invention provides a data processing method and system for administering a deferred annuity contract during the accumulation phase of a contract term, wherein the annuity contract permits the annuitant to select both an interest rate which is adjusted periodically (reset rate) and an interest rate guaranteed for multiple years (MYG rate), during the same contract term. If the consumer selects the reset rate initially, typically the consumer is earning a higher rate of interest on the consumer's premiums than that which is provided by the MYG rate but is also assuming a risk that the reset rate will decrease.

The insurer adjusts the reset rate at its discretion or based upon an external index. The insurer declares the reset rate in advance of its effective date and at any point in time, it may be lower than the MYG rate, which is applied on the day the annuity contract is issued. In the event the reset rate is lower than the MYG rate, the annuitant has the option of electing that the MYG rate be applied, from that point forward, to the annuitant's account balance. In another embodiment of the invention, the election may be made automatic such that once the reset rate falls below the MYG rate, no action on the annuitant's part is required to change the interest rate to the guaranteed, MYG rate. The election of the MYG rate, subsequent to the election of the reset rate, is a one-time option and applies until the end of the contract term, regardless of whether the election is automatic or initiated by the annuitant.

The present invention solves several of the problems associated with conventional administration of annuity contracts. It provides an annuity contract, system and method, which will reduce the risk of annuitants who elect to receive adjustable rates that can be reset periodically. Specifically, it provides an annuity contract, system and method containing a lock-in feature providing a guarantee that the adjustable interest rate payable to the annuitant will not fall below a declared guaranteed interest rate, should the adjustable interest rate be significantly reset downwards. It also provides an annuity contract, system and method including this lock-in feature, as an option for the annuitant to exercise at will, or as an automatic feature elected upon issue of the annuity.

Other objects, features and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DESCRIPTION OF THE PREFERRED EMBODIMENTS

Figure 1:
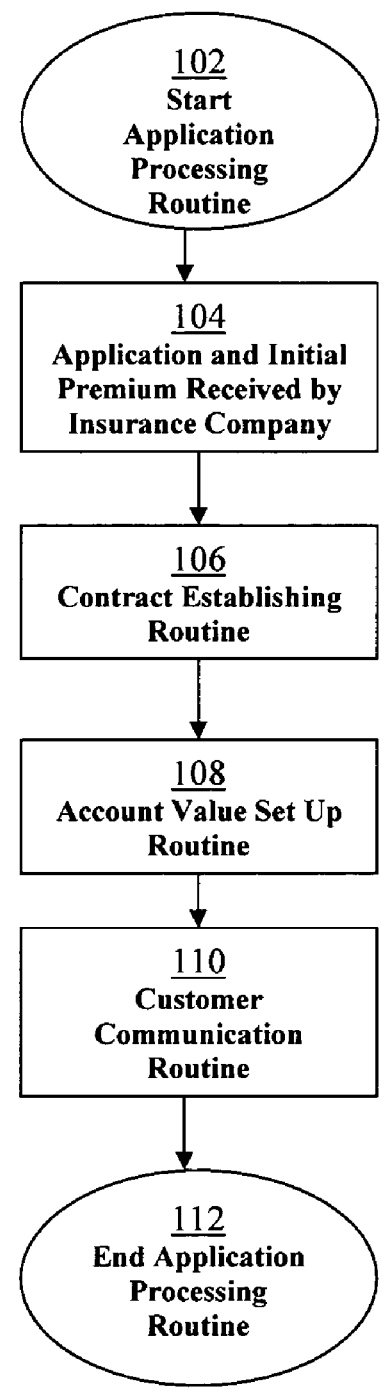
FIG. 1 is a flow chart illustrating the manner in which a new annuity contract application is processed.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. They are deemed to afford the best embodiment for purposes of disclosure; but should not be construed as limiting the scope of the invention. The following presents a detailed description of the preferred embodiment of the present invention.

The present invention comprises a data processing system and method for administering an annuity contract containing a lock-in interest rate feature. As used herein, the term "annuity contract" means a set of rules and other data that are reflected in a computer processing system for operations of the annuity product. The system, method and contract provide the annuitant with both the benefit of an adjustable interest rate, which reflects the movement of an external measure or insurer discretion, as well as a guaranteed interest rate. According to the invention, the lock-in feature insures that the interest rate payable to the annuitant will not fall below a declared guaranteed interest rate, should the adjustable rate be significantly reset downwards. The annuitant may select the lock-in as an automatic feature, elected upon issue of the annuity, or return the right to pick and choose, if and when, the guaranteed interest rate feature will be applied. The unique combination of these two capabilities makes the present invention a superior investment choice for annuitants, who wish to insure that their annuity accumulates enough to provide an adequate payout stream but at the same time, do not wish to absorb the significant risk that the interest rate they receive falls below a declared minimum level.

It should be understood that as used herein the term "periodically" includes method steps that in certain aspects may only be performed once. In other aspects, such "periodically" performed method steps may be performed more than once as described herein.

The following definitions are given hereunder to better understand terms used in the specification.

"Relevant Life" or "Covered Life": The term relevant life or covered life is the governing life for determination of the living benefits provided under this illustrative embodiment. Covered life (or relevant life) may refer to any one or more of the following: an owner, joint owner, annuitant, joint annuitant, co-owner, co-annuitant or beneficiary.

"Premium": 100% of the dollar amount of the initial or subsequent premium payments deposited into the contract before application of any sales charges or payment enhancements.

"Account Value": The account value (CV) is a numerical measure of the relative worth of a variable annuity product during the accumulation phase. The account value (also called the contract value) is determined by adding the amount of purchase payments made during the accumulation phase, deducting management fees, deducting contract fees, deducting optional rider fees and surrenders made by the owner, and adjusting for the relative increase (or decrease) of the investment option(s) chosen by the owner. It should be understood that in other embodiments of the present invention, other formulas may be utilized for determining the account value.

"Sub-account": Variable account investments within the variable annuity contract, such as mutual funds, stocks and bonds.

"Annuity Commencement Date": The annuity commencement date (ACD) is the date upon which the contract enters the "annuitization phase."

"Annuity Contract": The term annuity contract means a set of rules and other data that are reflected in a computer processing system for operations of the annuity product.

"Issue Rules": The issuance of a contract may be subject to established requirements known as issue rules.

"Interest Rate Lock-in Feature": The interest rate lock-in is a feature of an annuity contract that provides a guarantee that the adjustable interest rate payable to the annuitant will not fall below a declared guaranteed interest rate, should the adjustable interest rate be significantly reset downwards.

The following detailed illustrative embodiment(s) is presented to provide a more complete understanding of the invention. The specific techniques, systems, and operating structures set forth to illustrate the principles and practice of the invention may be embodied in a wide variety of sizes, shapes, forms and modes, some of which may be quite different from those in the disclosed embodiment. Consequently, the specific structural and functional details disclosed herein are exemplary. They are deemed to afford the best embodiment for purposes of disclosure; but should not be construed as limiting the scope of the invention.

Covered Life in Single and Joint/Spousal Election(s)

The covered life, or relevant life, may have a single life election or joint/spousal continuation election as described more fully herein.

Single Life Election:

If a natural owner, the covered life is the owner and the joint owner (if any) on the rider effective date. If a non-natural owner, the covered life is the annuitant on the rider effective date. All age-contingent benefit provisions are based on the attained age of the oldest covered life.

Joint/Spousal Continuation Election:

If a natural owner, the covered life is both spouses (as defined by Federal Law). All age-contingent benefit provisions are based on the attained age of the youngest covered life.

Issues Rules

The following issue rules are set forth to provide a more complete understanding of this illustrative embodiment of the present invention. It should be understood by those skilled in the art that these issue rules are set forth for illustrative purposes only and that other rules may be utilized. Accordingly, the issue rules set forth below should not be construed as limiting the scope of the invention.

The issue rules may include a maximum issue age. In one embodiment, the riders are not available if any covered life or annuitant is age 81 (or other predetermined age) or greater on the rider effective date. In another embodiment, the riders are not available if any covered life or annuitant is age 76 (or other predetermined age) or greater on the Rider effective date. The rider may be elected on contract issue or post-issue.

Additional Annuity Contract(s) Rules

Additional terms of the contract(s) or rider(s) include the following. The benefits under the contract cannot be assigned. If the free look provision under the contract is exercised, the rider will terminate.

Turning now to the figures, FIG. 1 illustrates the manner in which a new annuity contract application is processed. The new application processing routine starts (block 102) when an application is completed. The annuity contract application and initial premium are received by the insurance company (block 104). The annuity contract is then established through the contract establishing routine (block 106) as further described in FIG. 2. After the annuity contract is established, the account value is then set up through the account value set up routine (block 108), via the computer systems, as further specified in FIG. 3. Thereafter customer communication is established through the customer communication routine (block 110) as further specified in FIG. 4. The application processing routine ends at (block 112).

Figure 2:
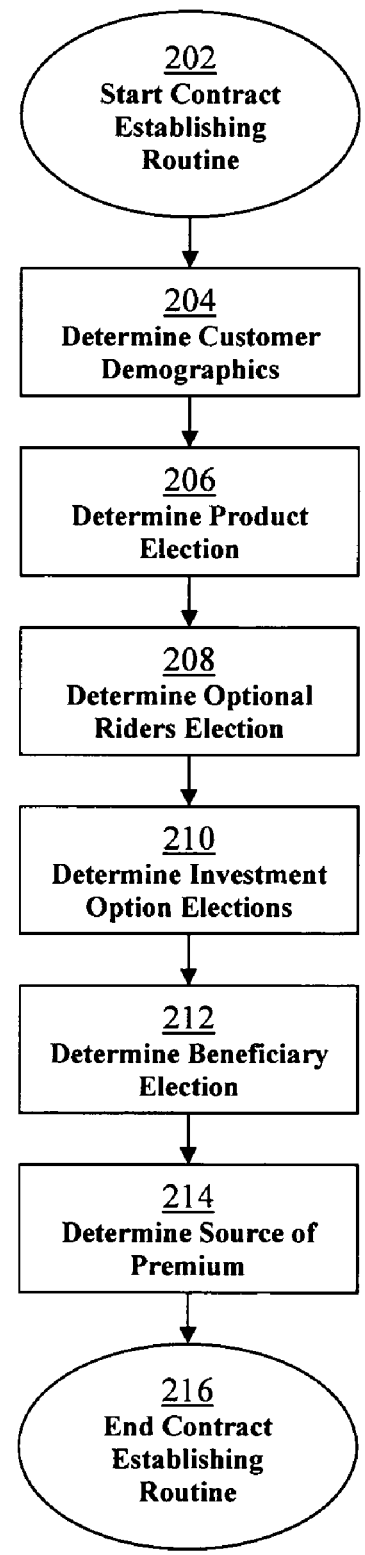
FIG. 2 is a flow chart that illustrates in more detail the manner in which an annuity contract is established.

FIG. 2 is a flow chart that illustrates in more detail the manner in which an annuity contract is established. The annuity contract establishing routine starts at (block 202). After receiving the annuity contract application, customer demographics are determined (block 204). The customer demographics and other data from the annuity contract application are transmitted to the insurance company by any suitable means, such as electronic transmission, facsimile transmission, telephonic transmission and the like. The customer demographics may be scanned in or electronically entered into the computer system by the insurance company after the demographic data is determined. Such demographic information may include age, gender, date of birth, social security number, address, marital status, and the like. The customer demographics may be used for a variety of purposes, such as identification purposes or to locate a relevant life by searching his/her social security number. The customer demographics are also used when determining and/or calculating a variety of factors that are related to the annuity contract, such as benefit amount calculations, tax considerations, and the like. The types of customer demographics that are determined are generally related to the type of annuity contract application that is filled out by the relevant life. The specific product election is determined (block 206). For example, the specific product may be elected from a group of different variable annuity products that each has different characteristics including the costs and fees as well as the liquidity features associated therewith. The election of optional riders is determined (block 208). For example, the optional riders may be elected from a group of different riders, which each have various guaranteed withdrawal features. The election of investment options is determined (block 210). For example, the investment options include money market funds, bond funds, stock funds and the like. The beneficiary is elected (block 212). In one aspect, this is the person who will collect the death benefits, if any. The source of the premium is determined (block 214). For example, the source of the premium may come from the relevant life's personal funds or may come from another annuity in the form of a transfer. It should be understood that the steps taken for establishing the contract may proceed in various orders and that the order shown in FIG. 2 is for illustrative purposes only and is only one embodiment of said steps. The contract establishing routine ends at (block 216).

Figure 3:
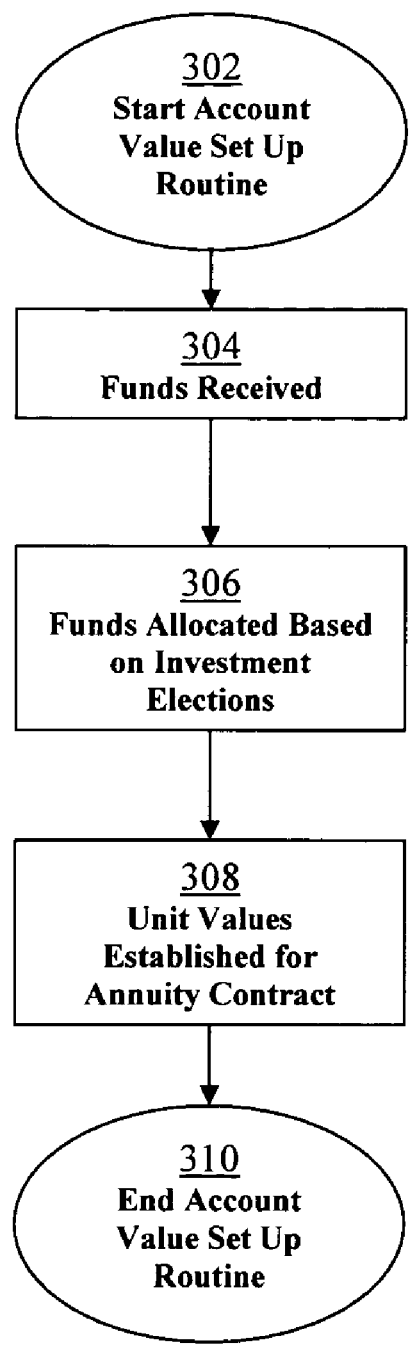
FIG. 3 is a flow chart that illustrates in more detail the manner in which an account value is set up.

FIG. 3 is a flow chart that illustrates in more detail the manner in which an account value is set up. The account value set up routine starts at (block 302). The funds are received (block 304). For example, the funds may be received via electronic transfer from a bank account or from another variable annuity holder. The funds are then allocated based on investment elections (block 306). For example, the allocations can be accomplished through a computerized system according to the investment elections by the relevant life. Unit values are established for the annuity contract (block 308). For example, based on the performance of the underlying investment elections, unit values are established, preferably on a daily basis, for use in determining the resulting impact on the relevant life's annuity contract based on their specific fund allocations. For example, the number of units that are applied to each annuity contract is different for each relevant life based on the number of units held within the annuity contract. It should be understood that the steps taken for setting up the account value may proceed in various orders and that the order shown in FIG. 3 is for illustrative purposes only and is only one embodiment of said steps. The account value set up routine ends at (block 310).

Figure 4:
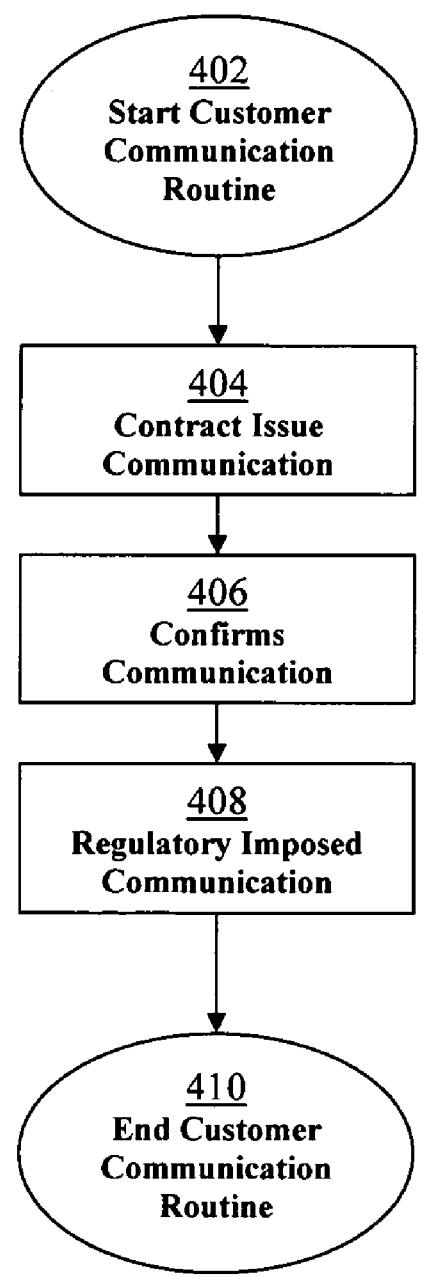
FIG. 4 is a flow chart that illustrates in more detail the manner in which customer communication is established.

FIG. 4 is a flow chart that illustrates in more detail the manner in which customer communication is established. The customer communication routine starts at (block 402). Communications with the customer may be accomplished via email, facsimile, letter, telephone, and the like. Communication with the customer in one aspect relates to the issuing of the contract (block 404). Communication with the customer in one aspect relates to the relevant confirmation of the previous contract issuance communication (block 406). Any regulatory-imposed communication with the client is accomplished (block 408). It should be understood that the steps taken for establishing customer, communication may proceed in various orders and that the order shown in FIG. 4 is for illustrative purposes only and is only one embodiment of said steps. The customer communication routine ends at (block 410).

Figure 5:
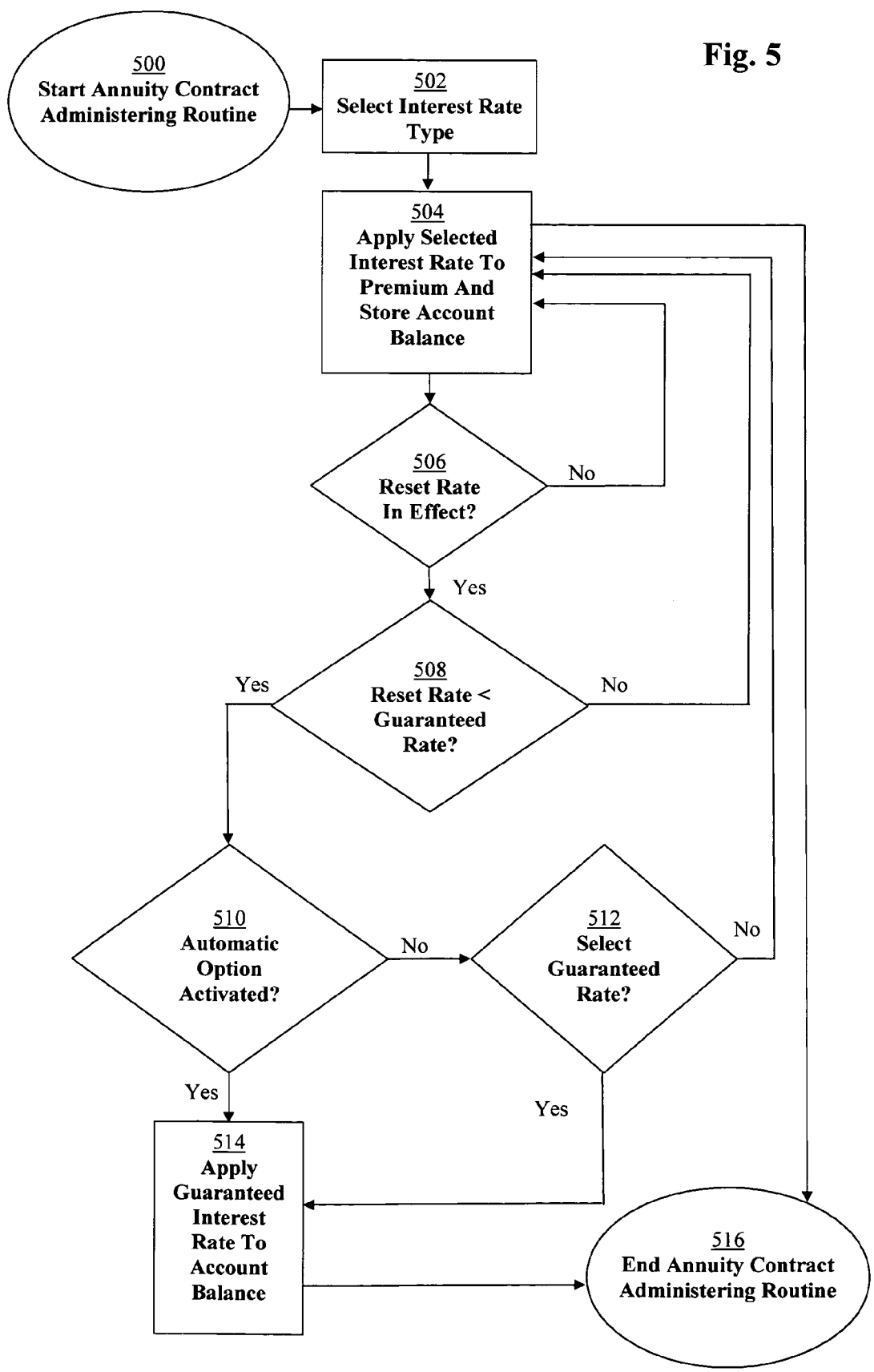
FIG. 5 is a flow chart illustrating a data processing method for administering an annuity contract with a rate lock-in feature in accordance with an embodiment of the present invention.

FIG. 5 is a flow chart illustrating a data processing method for administering an annuity contract for an annuitant in accordance with an embodiment of the present invention. It should be understood that the order of the successive method steps is shown for the sake of illustrating but one example and that the order of method steps can proceed in any variety of orders.

In an embodiment of the present invention, the invention comprises a data processing method for administering an annuity contract for an annuitant, the annuity contract having a contract value and an interest rate lock-in feature. The present method comprises the following steps. The annuity contract administering routine starts (block 500), and the present method sometime later proceeds to allow the annuitant to select the type of interest rate the annuitant wishes to be applied to the annuitant's premiums, during the accumulation phase of the fixed rate annuity (block 502). If the annuitant wishes to absorb no risk at all, the annuitant selects a guaranteed interest rate (MYG rate) for the guaranteed period. Typically, the guaranteed period is several years or more. Additionally, the annuitant may also select to have an adjustable rate (reset rate) applied to the annuitant's premiums during the accumulation phase. The insurer declares this rate periodically, typically annually. The rate declared may be higher, lower or equal to the MYG rate and is typically based upon an external index; however, the insurer may use its own discretion in selecting the rate percent. The annuitant may also select a third choice, unique to this contract, to have the insurer automatically apply the reset rate to the annuitant's premium, until such time as the reset rate falls below the MYG rate. Should this event occur, the annuitant's accumulated account balance earns interest at the MYG rate, until the end of the contract term. This automatic transfer is a one-time event. In accordance with this third option, the reset rate is no longer available as an option for the annuitant, once the annuitant has transferred to the MYG rate. In an alternate embodiment, this automatic option is not available to the annuitant and the annuitant must manually request the transfer of funds and the application of the MYG rate for the remainder of the contract term.

The insurer calculates the interest credits the annuitant has accumulated at the end of each period, by multiplying the account value by the selected rate. The insurer adds the interest credits to the existing account value to generate a new accumulated account value (block 504). The insurer periodically checks to see whether the reset rate has been selected (block 506). If the reset rate has not been selected, the insurer applies the rate initially selected and adds interest credits to the existing account value to generate a new accumulated account value (block 504). If the reset rate has been selected the insurer proceeds to compare the reset rate with the MYG rate to see if the reset rate is the lower of the two rates (block 508). If the reset rate is not the lower of the two, the insurer applies the rate selected, i.e. the reset rate, and adds the interest credits to the existing account value to generate a new accumulated account value (block 504). If the reset rate is lower than the MYG rate, the insurer checks to see whether the annuitant has selected the automatic option (block 510).

If the annuitant has selected the automatic option, the insurer applies the MYG rate to the annuitant's premium and the account balance is earmarked for application of the MYG rate for the remainder of the contract term (block 514). If the annuitant has not selected the automatic option, the annuitant has the option of continuing to have the reset rate applied to the annuitant's premium and account balance or changing to the MYG rate (block 512). If the annuitant decides to select the MYG rate, the insurer applies the MYG rate to the annuitant's premium (block 514), however this is a one-time only change, and thus the MYG rate will automatically be applied to the annuitant's account balance for the remainder of the contract term. If the annuitant decides not to select the MYG rate, the insurer applies the selected interest rate and adds the interest credits to the existing account value to generate a new accumulated account value (block 504). This process continues until it is determined that the annuity contract should expire. Once it is determined via predetermined contract rules that the contract should expire, the annuity contract administering routine of the present method ends (block 516).

Figure 6:
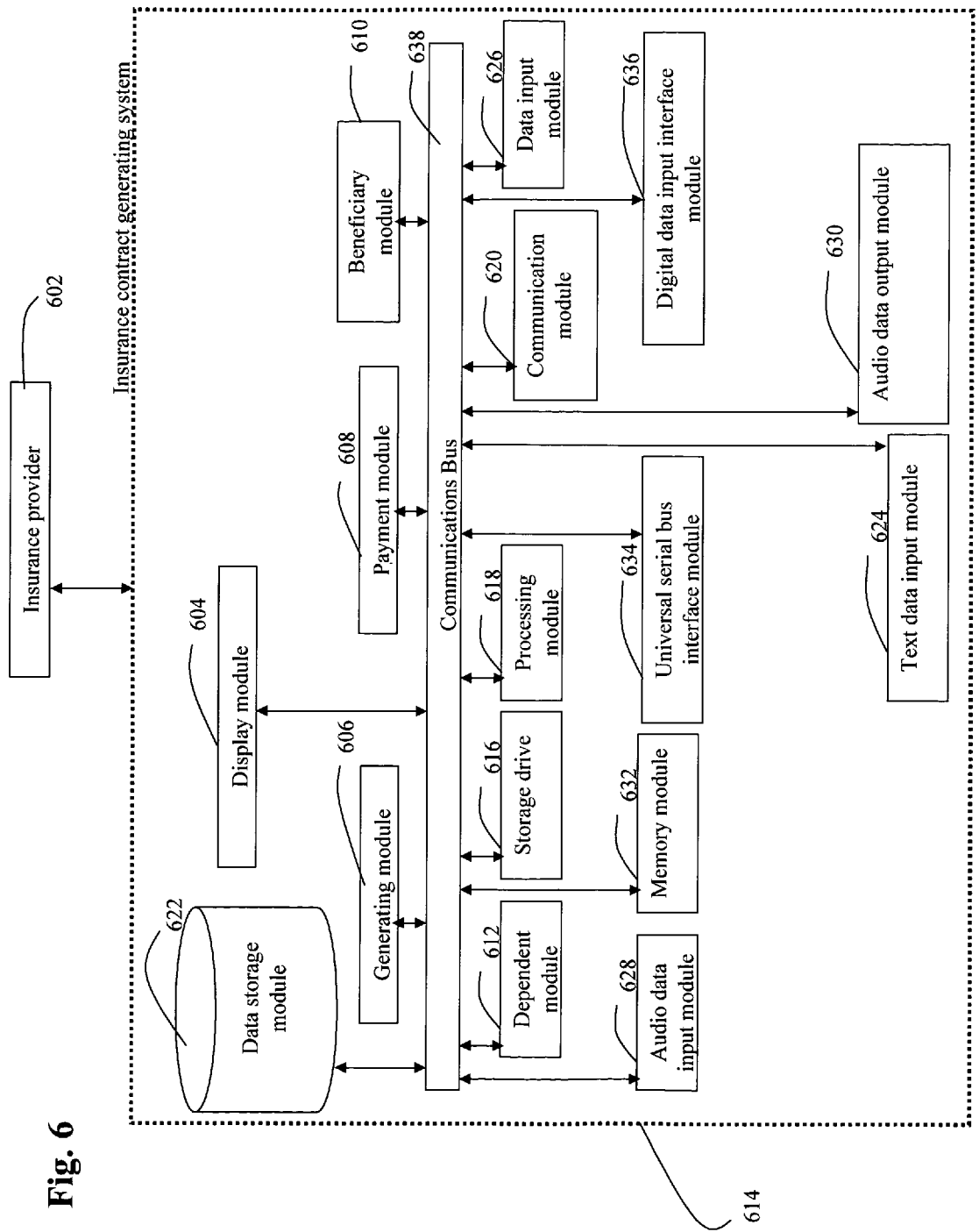
FIG. 6 is a diagram illustrating the system on which the methods of the present invention may be implemented in accordance with an embodiment of the present invention.

Referring next to FIG. 6, depicted is a preferred embodiment of a system on which the methods of the present invention may be implemented. In one example of the preferred embodiment, the insurance contract generating system 614 would generally be used by an insurance provider 602, however the system may be operated by any individual or organization offering an insurance product as outlined in the present specification without departing from the spirit of the present invention. System 614 may be implemented in many different ways such as part of a single standalone server or as a network server or servers, which may be distributed across multiple computing systems and architectures. Preferably, the central processing computer or network server includes at least one controller or central processing unit (CPU or processor), at least one communication port or hub, at least one random access memory (RAM), at least one read-only memory (ROM) and one or more databases or data storage devices. All of these latter elements are in communication with the CPU to facilitate the operation of the network server.

The network server may also be configured in a distributed architecture, wherein the server components or modules are housed in separate units or locations. Each of the modules described may be implemented as single servers or one or more or all of the modules may be incorporated into a single server. These servers will perform primary processing functions and contain at a minimum, a RAM, a ROM, and a general controller or processor. In such an embodiment, each server is connected to a communications hub or port that serves as a primary communication link with other servers, clients or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

In the preferred embodiment, all of the modules described herein are operably inter-connected via a central communications bus 638. The communications bus 638 is able to receive information from each of the modules, as well as to transmit information from one module to another. The insurance contract generating system 614 further includes a display module 604, and a generating module 606. The generating module is used for generating an insurance contract, wherein the insurance contract provides coverage to an individual or group for at least one event defined in the insurance contract.

The insurance contract generating system 614 additionally includes a payment module 608 for making payments to an insured individual or group for a predetermined period of time as defined by the deferred annuity insurance contract.

The system further comprises a beneficiary module 610 for choosing a beneficiary to receive payments from the insurance provider in the instance of an insured individual's death. Furthermore, the system comprises a dependent module 612 for offering an insurance contract structured according to the methods of the present invention to dependents of an individual eligible for the insurance contract described herein.

Additionally, the insurance contract generating system 614 includes: a storage drive 616 for receiving data stored on a storage disc, a processing module 618 for processing digital data received by and contained in the insurance contract generating system 614, a communication module 620 for bi-directional communication with external and telecommunications systems, a data storage module 622 for storing and managing digital information, a text data input module 624 for inputting data in the form of text, and a data input module 626 for converting to digital format documents and images and inputting them into the insurance contract generating system 614.

Finally, the insurance contract generating system 614 includes: an audio data input module 628 for receiving and inputting audio information, an audio data output module 630 for outputting data in audio format (i.e. recorded speech, synthetically generated speech from digital text, etc.), a memory module 632 for temporarily storing information as it is being processed by the processing module 618, a universal serial bus interface module 634 for receiving and transmitting data to and from devices capable of establishing a universal serial bus connection, and a digital data input interface module 636 for receiving data contained in digital storage devices.

Data storage device may include a hard magnetic disk drive, tape, optical storage units, CD-ROM drives, or flash memory. Such data storage devices generally contain databases used in processing transactions and/or calculations in accordance with the present invention. In one embodiment, the database software creates and manages these databases. Insurance-related calculations and/or algorithms of the present invention are stored in storage device and executed by the CPU.

The data storage device may also store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, and each record includes fields that are specific to the present invention such as interest rates, contract value, payment base value, step-up percent, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as providing a deferred annuity insurance contract to an individual, generating a deferred annuity insurance contract, and making payments to the individual as defined in the deferred annuity insurance contract. The functions described above are merely exemplary and should not be considered exhaustive of the type of function, which may be performed by the computer program code of the present inventions.

The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc.).

For example, a user provides instructions for the amount of the lifetime benefit payment that is requested. It should be understood that the user may communicate with the computing system directly or indirectly through another party, such as the insurance provider 602. In the event the user communicates with an insurance provider 602, the insurance provider 602 than receives and transfers information, to and from the insurance contract generating system 614 via the text data input module 624, audio data input module 628, audio data output module 630 and the display module 604. For example, the relevant life may provide instructions to the insurance provider 602 indicating the amount of the lifetime benefit payments the relevant life would like to receive. Furthermore, as used herein the data storage module 622 is also referred to as a storage device. The processing module 618 is contained within the insurance contract generating system 614, which is coupled to the storage device, the storage device stores instructions that are utilized by the processor. The instructions comprise: (i) an instruction for calculating a base contract value; (ii) an instruction for determining a Multi-Year Guarantee rate (MYG rate); (iii) an instruction for determining a reset rate; (iv) an instruction for comparing the above-referenced rates against each other; and (v) an instruction that allows the annuitant to choose which rate should be applied to the existing account value in order to generate a new accumulated account value.

It should be understood that several of the method steps of the present invention require input from the owner (i.e., payment of premiums) in order to be able to determine the respective values. After receiving that input, however, a computer is required to use the method of the present invention; the calculations and appropriate data records are performed by a computer. For example, the base contract value is related to premium payments by the annuitant, wherein some of the premium payments may be discretionary. The MYG rate is dependent on a pre-selected percentage selected by the annuitant and/or the company issuing the annuity. Additionally, the reset rate is preferably established based on the current market statistics, as reported by a governing body.

The following description and example further illustrate the preferred features of the present invention.

Table 1, set forth below, further illustrates how the lock-in feature would work in accordance with the present invention, when applied to a 7-year, fixed annuity, issued in this instance on Dec. 31, 2006.

TABLE 1

| Anniversary | Annual Reset Bucket | Guaranteed Bucket | Account Value | Annual Reset Rate | MYG Rate | Interest Credits |
|---|---|---|---|---|---|---|
| Dec. 31, 2006 | 100,000 | — | 100,000 | 4.2% | 4.0% | |
| Dec. 31, 2007 | 104,200 | — | 104,200 | 4.4% | 4.0% | 4,200 |
| Dec. 31, 2008 | 108,785 | — | 108,785 | 4.6% | 4.0% | 4,585 |
| Dec. 31, 2009 | 113,789 | — | 113,789 | 4.8% | 4.0% | 5,004 |
| Dec. 31, 2010 | 119,251 | — | 119,251 | 4.5% | 4.0% | 5,462 |
| Dec. 31, 2011 | 124,617 | — | 124,617 | 3.0% | 4.0% | |
| | | "Lock-In" | | | | |
| Dec. 31, 2011 | — | 124,617 | 124,617 | 3.0% | 4.0% | 5,366 |
| Dec. 31, 2012 | — | 129,602 | 129,602 | 5.0% | 4.0% | 4,985 |
| Dec. 31, 2013 | — | 134,786 | 134,786 | | | 5,184 |

The system deposits annuitant funds in the annual reset bucket to earn the initial rate (reset rate) of 4.2% as of Dec. 31, 2006. At this point in time, the reset rate of 4.2% exceeds the MYG rate. On the first anniversary, Dec. 31, 2007, the reset rate rises to 4.4% while the MYG rate remains static at 4.0%. The annuitant, at this point, has earned 4,200 interest credits generated by multiplying the reset rate of 4.2% by the account value of $100,000. The interest credits, or 4,200, are added to the amount in the annual reset bucket ($100,000), yielding $104,200, the account value as of Dec. 31, 2007.

On the second anniversary, Dec. 31, 2008, the reset rate is raised, once again, to 4.6%. By this time, 4,585 interest credits have been earned by multiplying 4.4%, the year 2007 interest rate, by the year 2007 account balance of $104,200. The interest credits are added to the account value yielding an account value of $108,785 as of Dec. 31, 2008. This process is repeated in years 2008, 2009, and 2010.

In year 2011, the lock-in feature of the present invention takes effect. As of Dec. 31, 2011, the reset rate falls to 3.0%, which is lower than the MYG rate of 4.0%. At this point, if the automatic option has been selected by the annuitant, or if the annuitant manually elects the lock-in option, the annuitant's interest rate switches to the MYG rate. Accordingly, for the following year, year 2012, the interest applied is not the reset rate of 3.0% but rather, the MYG rate of 4.0%. Instead of earning $3,739, which would correspond to an interest rate of 3.0%, the account value earns $5,366, which corresponds to an interest rate of 4.0%. Furthermore, the account value from this date forward until the end of the contract, in this case year 7, earns interest credits corresponding to the credits earned using the MYG rate as a multiplier.

Having thus described the invention in rather full detail, it will be understood that such detail need not be strictly adhered to, but that additional changes and modifications may suggest themselves to one skilled in the art, all falling within the scope of the invention as defined by the subjoined claims.

While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A data processing system for administering a deferred annuity contract during an accumulation phase, said system comprising:
   a communications device for receiving information for said deferred annuity contract, wherein said deferred annuity contract further including an account value, an annuity term and an annuity commencement date;
   a storage device coupled to said communications device for storing said received information, and data indicative of a guaranteed interest rate, a periodic reset interest rate and an interest rate lock-in feature;
   a processor operably coupled to said storage device, configured to change an interest rate applied to the account value from said reset interest rate to said guaranteed interest rate, in accordance with said interest rate lock-in feature, when said reset interest rate falls below said guaranteed interest rate; and
   said communications device for offering said deferred annuity contract.

2. The data processing system of claim 1 further comprising said communications device coupled to said processor for receiving premium payments, said premium payments are received during said accumulation phase.

3. The data processing system of claim 2 wherein said guaranteed interest rate is a fixed interest rate, said guaranteed interest rate being fixed over said accumulation phase.

4. The data processing system of claim 3 wherein said reset interest rate is an adjustable interest rate, said adjustable interest rate being varied over said accumulation phase.

5. The data processing system of claim 4 further comprising said communications device in communication with said processor for receiving a request to select said reset interest rate.

6. The data processing system of claim 5 wherein said account value is a product of said premium payments and said interest rate applied to the account.

7. The data processing system of claim 5 wherein said reset interest rate is applied to said premium payments.

8. The data processing system of claim 1 wherein said change is a one-time change.

9. The data processing system of claim 8 wherein said account value is calculated according to said guaranteed interest rate for a remainder of said annuity term.

10. The data processing system of claim 8 further comprising said processor configured for changing said interest rate from said reset interest rate to said guaranteed interest rate, said change being automatically made.

11. The data processing system of claim 8 further comprising said processor configured for changing said interest rate from said reset rate to said guaranteed rate, said change manually being received.

12. The data processing system of claim 1 wherein said reset interest rate is based upon an external index.

13. The data processing system of claim 1 wherein said reset interest rate is determined annually.

14. The data processing system of claim 1, wherein said storage device is further for storing data indicative of optional riders, said riders being provided with said annuity contract.

15. The data processing system of claim 1 wherein said information is received from an annuitant.

16. A computer implemented data processing method for administering a deferred annuity contract during an accumulation phase, the method comprising:
- receiving, via a communications device of a computer, information for the deferred annuity contract, wherein the deferred annuity contract further including an account value, an annuity term and an annuity commencement date;
- determining, via a processor of the computer coupled to the communications device, an interest rate for crediting to the account value, the interest rate is selected from one of a guaranteed interest rate and a periodic reset interest rate;
- offering, via the processor, an interest rate lock-in feature;
- issuing, via the communications device, the deferred annuity contract; and
- changing, via the processor, during the accumulation phase, from the reset interest rate to the guaranteed interest rate in accordance with the interest rate lock-in feature, when the reset interest rate falls below the guaranteed interest rate.

17. The computer implemented method of claim 16 further comprising the step of receiving, via the communications device, premium payments, wherein the premium payments are received during the accumulation phase.

18. The computer implemented method of claim 17 wherein the account value is a product of the premium payments and the interest rate for crediting to the account value.

19. The computer implemented method of claim 17 wherein the guaranteed interest rate is a fixed interest rate, and wherein the guaranteed interest rate is fixed over the accumulation phase.

20. The computer implemented method of claim 19 wherein the reset interest rate is an adjustable interest rate, and wherein the adjustable interest rate varies over the accumulation phase.

21. The computer implemented method of claim 20 further comprising the step of receiving, via the communications device, a request to select the interest rate for crediting to the account value, wherein the selected interest rate is applied to the received premium payments.

22. The computer implemented method of claim 21 wherein the interest rate lock-in feature comprises an option to change the interest rate from the reset interest rate to the guaranteed interest rate.

23. The computer implemented method of claim 16 wherein the change is a one-time change.

24. The computer implemented method of claim 23 wherein the account value is calculated according to the guaranteed interest rate for a remainder of the annuity term.

25. The computer implemented method of claim 16 wherein the step of changing is made.

26. The computer implemented method of claim 16 wherein the step of changing is performed responsive to an instruction received from the annuitant.

27. The computer-implemented method of claim 16 wherein the reset interest rate is based upon an external index.

28. The computer implemented method of claim 16 wherein the reset interest rate is determined annually.

29. The computer implemented method, of claim 16 further comprising the step of storing, via the processor, in a storage device in communication with the processor, data indicative of optional riders, the riders being provided with the annuity contract.

* * * * *